United States Patent
Walls

(10) Patent No.: US 6,618,052 B1
(45) Date of Patent: Sep. 9, 2003

(54) METHOD AND APPARATUS OF GRAPHICAL DISPLAY OF INFORMATION

(75) Inventor: Alan James Walls, Christchurch (NZ)

(73) Assignee: Trimble Navigation Ltd., Sunnyvale, CA (US)

(*) Notice: Subject to any disclaimer, the term of this patent is extended or adjusted under 35 U.S.C. 154(b) by 0 days.

(21) Appl. No.: 09/338,454

(22) Filed: Jun. 22, 1999

(51) Int. Cl.[7] .............................................. G06T 11/20
(52) U.S. Cl. .................................................... 345/440
(58) Field of Search ................................ 345/133, 135, 345/440, 443; 382/109; 348/169

(56) References Cited

U.S. PATENT DOCUMENTS

| | | | |
|---|---|---|---|
| 6,008,817 A | * 12/1999 | Gilmore | 345/440 |
| 6,023,280 A | * 2/2000 | Becker et al. | 345/440 |
| 6,043,825 A | * 3/2000 | Glenn et al. | 345/440 |
| RE36,840 E | * 8/2000 | Mihalisin et al. | 345/440 |
| 6,169,552 B1 | * 1/2001 | Endo et al. | 345/133 |
| 6,292,215 B1 | * 9/2001 | Vincent | 348/169 |
| 6,362,823 B1 | * 3/2002 | Johnson et al. | 345/440 |

* cited by examiner

*Primary Examiner*—Jeffery Brier
*Assistant Examiner*—Chante'Harrison
(74) *Attorney, Agent, or Firm*—Blakely Sokoloff Taylor & Zafman LLP

(57) ABSTRACT

A system and method of graphical display of survey information in which input survey data is classified as important or less important and the graphical display shows the important data as a point and a solid vector, and the less important data as a point and a stub-vector, such that the display of the less important data does not significantly obscure the display of the important data.

18 Claims, 3 Drawing Sheets

METHOD AND APPARATUS OF GRAPHICAL DISPLAY OF INFORMATION

BACKGROUND OF THE INVENTION

1. Field of the Invention

The present invention relates to a method of graphical display of information, in particular survey information.

2. Background of the Art

When a survey is conducted, it is standard practice initially to establish one or more control lines for the survey. As used herein, the term "control line" means a straight line of accurately determined length which extends through, or adjacent to, the area to be surveyed; both ends of the control line are very accurately determined 'base points' and generally are established by making multiple observations. Alternatively, one or both ends of the control line may be known base points with co-ordinates established from earlier surveys. Depending upon the size of the area to be surveyed, several or many control lines may be established, to build up a network of control lines over the survey area. Typically, all control lines are very accurately surveyed, with multiple observations.

Control lines may be surveyed using any appropriate techniques. For example, if conventional survey techniques using optical survey equipment are used, control lines may be established by means of a traverse survey or a triangulation scheme from a baseline. Alternatively, if global positioning systems (GPS) survey equipment is used, control lines may be established using any of a range of known GPS surveying techniques.

Once each control line has been established, it is usual to complete the survey by making side shots i.e. further survey observations of all significant features in the area being surveyed. The features selected as 'significant' by the surveyor naturally depend upon the purpose of the survey: for example, if the surveying is to produce a topographical map, then the additional significant features will be all major topographical features in the survey area. In a majority of surveys, a very large number of side shots may be made, working from one or more base points on the or each control line. In general, side shots are measured with a lower level of accuracy than the shots to establish the base points and control lines.

Survey data may of course be recorded manually, but modern surveying practice is to record all survey data using a field data collection device and ultimately to input the survey readings into the memory of a computer which is programmed to record and display the surveyed data and to display graphically on the screen the survey points and lines based on that data. As used herein, the term 'field data collection device' includes a range of suitable devices, including hand-held electronic data collectors and field computers. Field data collection devices usually record the manner in which the data is collected. The present practice is for the computer to display graphically all of the survey lines, so that a complete picture of the survey is created. This works reasonably well for surveys conducted with conventional equipment i.e., optical equipment, since the survey range of optical equipment must be line-of-sight and in most cases it is not feasible to make a very large number of side shots from a single point on a control line using optical equipment. A typical optical survey will have very much shorter control lines than an equivalent GPS survey that is not limited to line of sight. In an optical survey, when side shots are taken over any particular area, the side shots are taken from base points on a series of different control lines, with much fewer side shots from each individual base point. Thus, when these side shots are represented graphically, the side shot lines (i.e. the lines linking each side shot with the corresponding control line base point) are spread along the different control lines.

However, difficulties arise when this display method is used for data obtained from a GPS survey. With GPS surveying equipment, it is not only feasible, but desirable, to make a large number of side shots from a single base point, because the GPS surveying equipment has a substantially greater range than conventional optical equipment. When a large number of side shot observations are displayed graphically as described above, the graphical display shows a dense cluster of lines around the base point from which the observations were made. A typical screen picture of a graphical display of numerous side shot observations is shown in FIG. 1. It is observed that the numerous lines from each side shot to the base point form a dense, unreadable clutter which actually obscures many of the individual shots and also obscures the control line itself.

This drawback makes the graphical display very much less useful than it should be. The surveyor cannot select the control line or an area of side shots for editing since the control line is obscured and conventional editing techniques (typically, boxing an area A on the graphical display) are useless because the area selected contains not only the side shot points but also many of the lines connecting more remote side shots with the base point.

SUMMARY OF THE INVENTION

The present invention provides a method and apparatus for displaying survey information in one embodiment. The method includes classifying survey data as important or less/not important, displaying data classified as important as a point and a solid vector from that point, and displaying data classified as not less/not important or less important as a point and a stub vector from that point. The length of each stub vector may be selected such that each stub vector is of sufficient length to provide a visual appreciation of the vector direction but sufficiently short that a majority of the stub vectors in the graphical display do not obscure each other or the rest of the display.

BRIEF DESCRIPTION OF THE DRAWINGS

The objects, features and advantages of the present invention will be apparent from the following detailed description in which.

DETAILED DESCRIPTION

The present invention provides a method and a device to improve a display of survey data. In the following description of the several embodiments of the invention, numerous details are set forth in order to provide a thorough understanding of the present invention. It will be appreciated by one having ordinary skill in the art that the present invention may be practiced without such specific details. In other instances, well known structures and techniques have not been described in detail in order to avoid obscuring the subject matter of the present invention. It will be understood by those having ordinary skill in the art that the structures of the present invention may be formed by various techniques.

Figure 1:
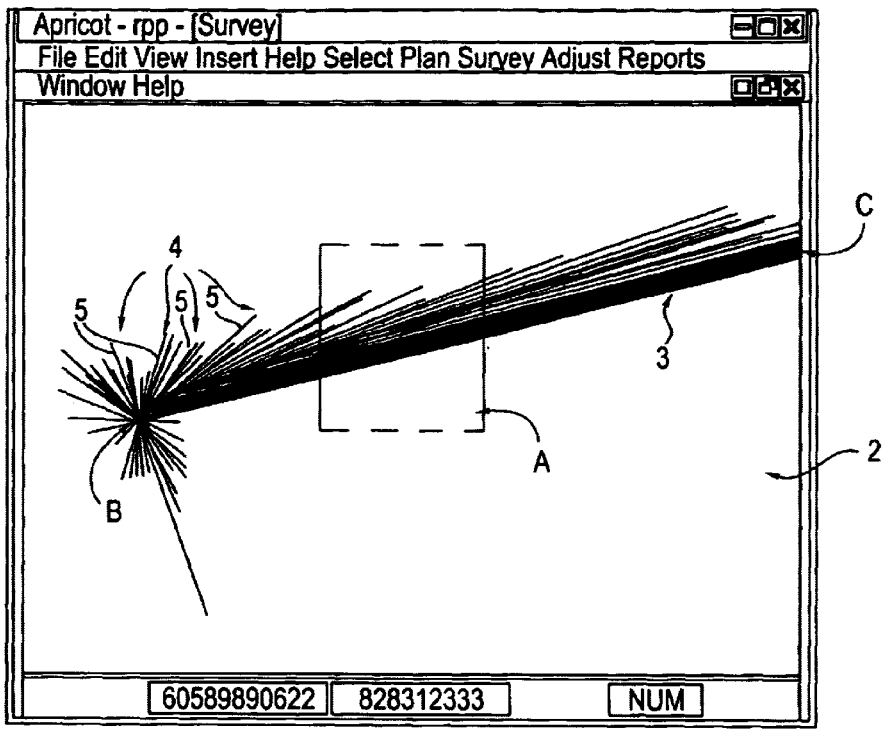
FIG. 1 shows a typical screen picture of survey information represented graphically in accordance with the prior art.
Figure 2:
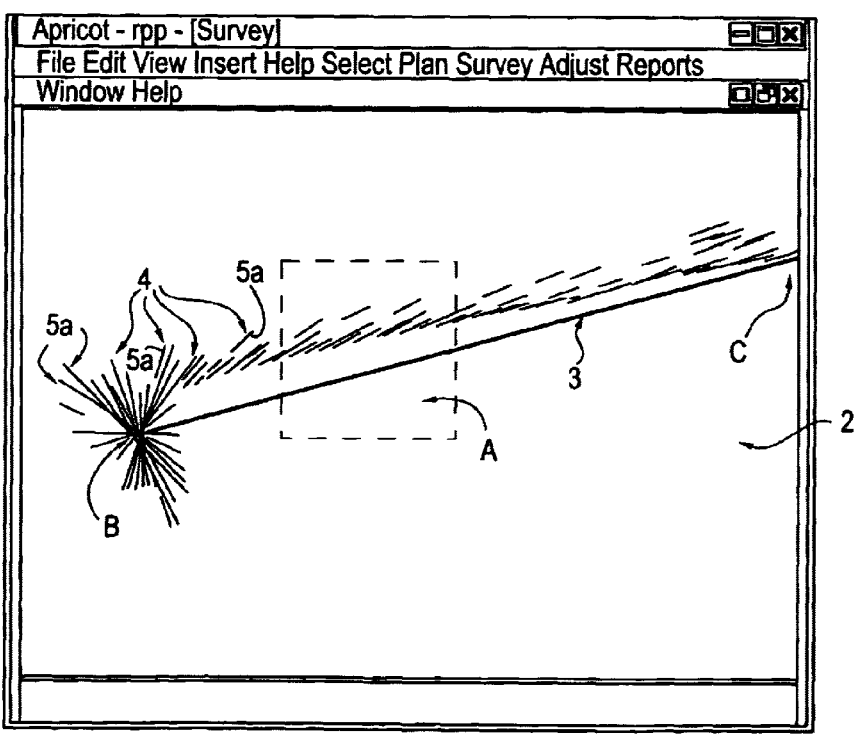
FIG. 2 shows one embodiment of a screen picture of survey information represented graphically in accordance with the present invention.

FIG. 1 and FIG. 2 both show information from a GPS survey of an area, represented graphically upon a screen 2. A control line 3 has been established by accurate surveying of base points B and C.

Figure 4:
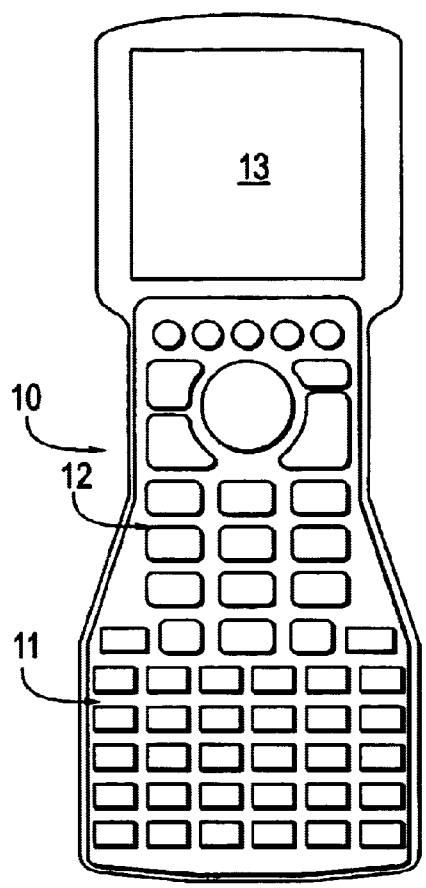
FIG. 4 shows a diagrammatic plan view of one embodiment of a hand-held electronic data collector.

The surveying techniques used may be any of a known range of survey techniques (GPS or optical) and therefore will not be described in detail. For example, points B and C and control line 3 can be established by means of a GPS static survey technique using two dual frequency GPS receivers, one of which is located at point B and the other at point C. The two receivers simultaneously observe at least four common satellites for a period of approximately 60 minutes, to establish the co-ordinates of points B and C with very high accuracy (typically +/−0.5 cm plus 1 ppm). These observations may then be repeated at a different time, when a different pattern of satellites is present, as a check on the first set of observations. The co-ordinates of points B and C are recorded on a hand-held electronic data collector 10 (FIG. 4) such as the data collector manufactured by Trimble Navigation Ltd as the TSCI™ data logger (TSCI is a trademark or Trimble Navigation, Limited). Typically, the data collector 10 provides alphabet and numeric keypads 11, 12 respectively and a display screen 13, and can be programmed to operate software such as Trimble Survey Controller™ (Survey Controller is a trademark of Trimble Navigation Limited) 6.5 Software which permits input, recording and processing of survey data and also allows for storage of reference data (e.g. maps) and for downloading of data to a computer. The data collector 10 also has the ability to record the manner in which each item of data is collected.

The above procedure may be repeated to establish a network of control lines, if required. However, for purposes of illustration, only a single control line 3 will be considered.

To complete the survey, a large number of side shots are taken from point B as a base point. Typically, the side shots would be observations of features to be included in the survey such as topographical features and the side shot measurements would be taken to a lower level of accuracy than the measurements for the control network. However, it is of course possible for the side shots to be made to the same level of accuracy as the measurements for the control network.

Figure 5:
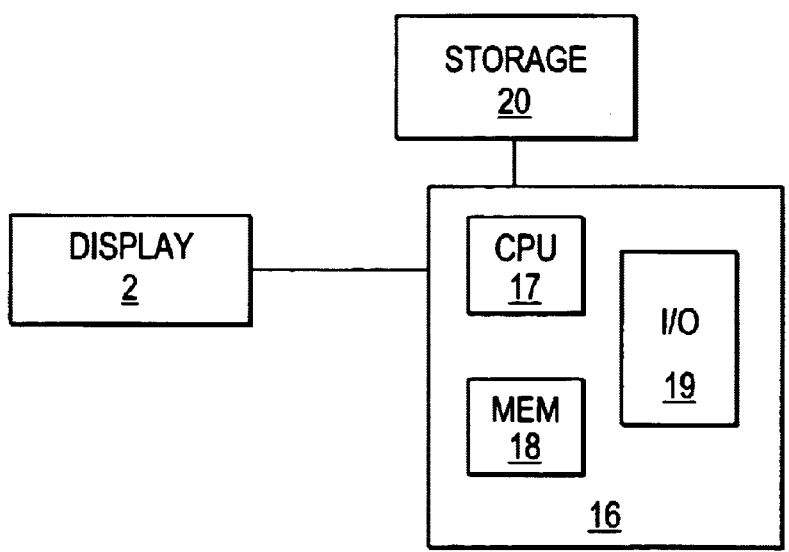
FIG. 5 shows a block diagram of one embodiment of a processing and display equipment suitable for the method of the present invention.

Each side shot measurement results in a point the position of which is known relative to the base point B. These measurements are entered into the data collector 10 in the same manner as the control line measurements. The survey data is then downloaded to the equipment of the type shown in FIG. 5, which includes the display screen 2 which is coupled to a processor system 16. The system 16 contains a central processing unit (CPU) 17, memory 18, and input/output ports 19. The system 16 may also be coupled to a storage device 20. The processing unit 17 receives instructions from the memory 18, storage device 20 and/or through transmission media; these instructions, when executed, perform the steps described herein for the generation of the graphic display on the display screen 2.

The survey measurements are represented graphically on screen 2 as shown in FIG. 1, each side shot point 4 is represented by a dot connected to the base point B by a vector line 5. For clarity, only a few of the points 4 and vectors have been numbered in drawings.

Referring to FIG. 1, only a few side shots are required, the screen picture remains reasonably clear individual side shots can be distinguished and the control line 3 is not obscured. However, it is rare for only a few side shots to be taken. Typically, a very large number of side shots are taken. Since all of the side shots are taken from base point B, all of the vectors 5 lead back to point B, and this gives rise to the multitude of vectors 5 obscuring each other and also obscuring the control line 3. In addition, some areas such as the vectors 5 are so numerous that they also obscure many of the points 4.

This cluttering of the screen picture greatly reduces the utility of the graphical representation of the survey data. As discussed above, many of the individual side shot points 4 and vectors 5 are obscured, and the control line 3 cannot be seen clearly. Further, the display cannot be edited by the surveyor since the display cannot be seen clearly. A standard editing technique is to box an area of the display, as shown in broken lines in square A, and then graphically modify the area within the box using tools, such as a cursor control device; e.g., by deleting vectors 5 not of immediate interest. However this technique cannot be used effectively with the screen picture of FIG. 1, because the box area A encloses vectors 5 from points 4 outside the box area and these vectors obscure many of the points 4 inside the box area.

In the present invention, data is classified as 'important' or 'less important' and displayed differently according to the classification. In one embodiment, survey data classified as important is displayed graphically as a point and a solid vector from that point and data classified as less important is displayed graphically as a point and a stub vector from that point. Each stub vector maybe a sufficient length to provide a visual appreciation of the vector angle but, buy not so long that it obscures other vectors or control lines on the display.

In one embodiment, a side shot vector 5 is abridged with a stub vector 5a adjacent to the corresponding point 4, so that in the resulting screen display, as shown in FIG. 2, the side shot points 4 can be clearly distinguished and the vectors 5 do not obscure each other, the points 4 or the control line 3. In the embodiment shown in FIG. 2 the vectors 5 are removed for clarity. However, in one embodiment, the vectors 5 are not removed, since the vectors 5 may be needed to give a rapid visual appreciation of the direction from the base point B to the corresponding side shot point 4.

The exact length of each stub vector 5a is not critical, but each vector 5a must be of a sufficient length to give a clear visual indication of the direction of the vector, but sufficiently short that the vectors 5a do not obscure each other, the side shot points 4, or the control line 3. As shown in FIG. 2, representing the vectors 5 as stub vectors 5a leaves the control line 3 clearly visible and also allows the surveyor to edit a box area such as area A without the numerous vectors 5 obscuring each other. The screen picture shown in FIG. 2 gives a clear and easily appreciated picture of the survey data.

In an alternate embodiment, the data can be classified in one of three or more levels of importance and the length or some other attribute, such as color or length may be varied in accordance with how the data is classified.

The data may be classified, e.g., classified as 'important' or 'less-important' directly by a user, either at the point of inputting the data into the computer or after the data has been input into the computer. Alternatively, the data is classified as 'important' or 'less-important' automatically by the field data collection device or computer, for example, by a computer program executing on the computer or field data collection device instructions that may include criteria. In one embodiment, automatic classification is performed in accordance with pre-specified criteria. The criteria for 'important' and 'less-important' data may be selected in a wide variety of ways, according to the type of survey. In a one embodiment of the invention, a criterion for 'important' data maybe one or more of the following:

a) Data relating to any point which may be the subject of multiple survey observations;

b) Data relating to any point which may have known co-ordinates before commencement of the survey;

c) Data obtained from specified high-accuracy surveying techniques; such as Static L1, Static L1/L2, 'Fast Static' (Trademark, Trimble Navigation Ltd).

d) Data intended to be added to, or processed by, a network adjustment calculation, where a network calculation is intended to include a survey technique that distributes errors in a network of survey observations uniformly among the coordinates of the points.

The criterion for 'less-important' data, include those not meeting the "important" criterion and/or one or more of the following:

a) Data relating to any point which may be the subject of a single observation;

b) Data obtained from specified lower-accuracy surveying techniques, e.g., Continuous Kinematic;

c) Data relating to any point not intended to be added to, or processed by, a network adjustment calculation.

Figure 3:
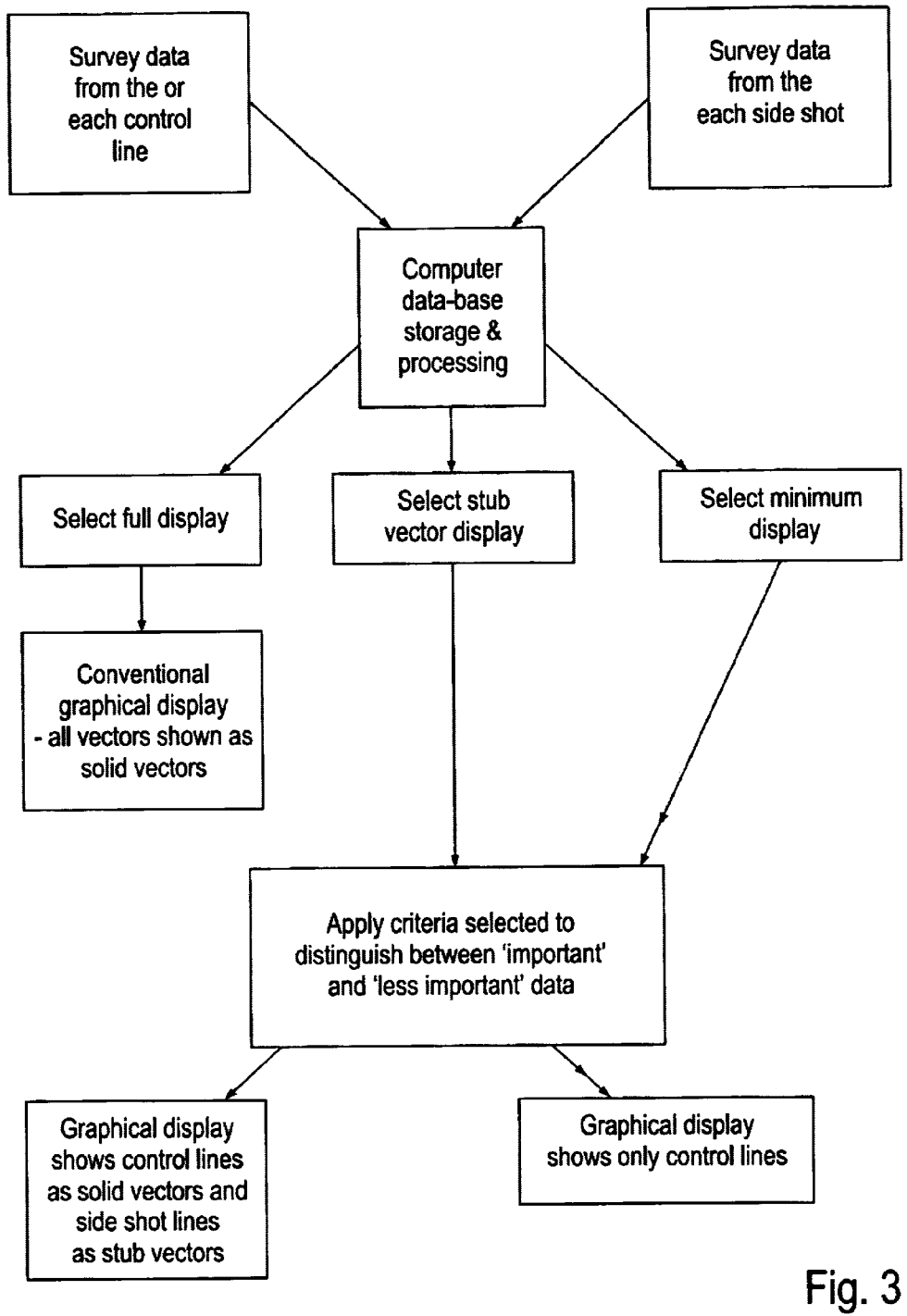
FIG. 3 shows one embodiment of a flow diagram of the options available with one embodiment of the method of the present invention.

As shown in FIG. 3, the program of the survey computer may have the facility of showing selected vectors as stub vectors as an option, so that the surveyor can select a screen picture with all the vectors shown in full, for example, as in FIG. 1, (the 'full display' option) or as stub vectors, for example, as shown in FIG. 2 (the 'stub vector display' option). Further, the program includes the facility to hide all of the stub vectors completely (the 'minimum display' option).

It will be appreciated that the screen pictures of the data may include numerical and other data also; this has been omitted from FIGS. 1 and 2 in the interests of clarity of illustration. Although the method of the present invention is of especial benefit when dealing with data from a GPS survey, it is emphasised that the method of the present invention may also be advantageous in presenting data from an optical instrument survey.

The present invention has been described with reference to specific exemplary embodiments. Various mode functions and changes may be made to these embodiments by one of ordinary skill in the art without departing from the broader spirit and scope of the invention as set forth in the following claims.

What is claimed is:

1. A method of electronic graphical display of survey information comprising:

receiving survey data relating to a base point on a control line associated with an area being surveyed, wherein said survey data is obtained from a group comprising a global positioning system survey and an optical instrument survey;

determining which data in the survey data is classified as of a first class and which data in the survey data is classified as of a second class, the classification being based on importance of data in the survey data; and graphically displaying the survey data such that the data classified as of the first class is displayed graphically as a point outside the control line and a solid vector from that point and the data classified as of the second class is displayed graphically as a point outside the control line and a stub vector from that point, the length of each said stub vector being shorter than the length of each said solid vector as not to obscure other vector and the control line.

2. The method as claimed in claim 1, wherein a first class comprises survey data classified as 'important' and the second class comprises data classified as 'less important'.

3. The method as claimed in claim 1, further comprising a user manually classifying the data.

4. The method as claimed in claim 1, further comprising a user classifying the survey data when the user inputs the data into a computer.

5. The method as claimed in claim 1, further comprising classifying the survey data by a computer program comparing said data with at least one criterion incorporated in said program.

6. The method as claimed in claim 5, wherein said criterion for important data is selected from the group comprising data not classified as 'less important'; data relating to any point which was the subject of multiple survey observations; data relating to any point which had known coordinates before commencement of the survey; data obtained from specified high-accuracy surveying techniques; and data intended to be added to, or processed by, a network adjustment calculation.

7. The method as claimed in claim 6, wherein said high-accuracy surveying techniques are selected from the group comprising Static L1, Static L1/L2, Fast Static.

8. The method as claimed in claim 5, wherein said criterion for 'less important' data is selected from the group comprising data not classified as 'important'; data relating to any point which is the subject of a single observation; data obtained from specified lower-accuracy surveying techniques; and data relating to any point not intended to be added to, or processed by, a network adjustment calculation.

9. The method as claimed in claim 1 wherein the length of each stub vector is selected such that each stub vector is of sufficient length to provide a visual appreciation of the vector direction but sufficiently short that at least a portion of the stub vectors in the graphical display do not obscure each other and the rest of the display.

10. A processing system configured to display data, said system comprising:

a) a display;

b) a processor coupled to the display, said processor configured to receive survey data relating to a point on a control line associated with an area being surveyed, to determine which data in the survey data is classified as of a first class and which data in the survey class is classified as of a second class, the classification being based on importance of data in the survey data, and to graphically display said survey data such that the data classified as of the first class is displayed graphically as a point outside the control line and a solid vector from that point, and the data classified as of the second class is displayed graphically as a point outside the control line and a stub vector from that point, the length of each said stub vector being shorter than the length of each said solid vector as not to obscure other vectors and the control line, whereby said survey data is obtained from survey selected from a group comprising a global positioning system survey and an optical instrument survey.

11. The processing system as claimed in claim 10, wherein the first class comprises data classified as 'important', and the second class comprises data classified as "less-important".

12. A processing system as claimed in claim 11, further comprising a processor configured to classify the received survey data as 'important' or as 'less important' by comparing said survey data with criteria.

13. A processing system as claimed in claim 11, wherein said criterion for 'important' data is selected from the group comprising data not classified as 'less important'; data relating to any point which was the subject of multiple survey observations; data relating to any point which had known co-ordinates before commencement of the survey; data obtained from specified high-accuracy surveying techniques; and data intended to be added to, or processed by, a network adjustment calculation.

14. A processing system as claimed in claim 11, wherein said criterion for "less important" data is selected from the group comprising data not classified as 'important'; data relating to any point which is the subject of a single observation; data obtained from specified lower-accuracy surveying techniques; and data relating to any point not intended to be added to, or processed by, a network adjustment calculation.

15. A computer readable medium containing instructions which, when executed in a processing system, perform operations comprising:

receiving survey data relating to a point on a control line associated with an area being surveyed;

determining which data in the survey data is classified as of a first class and which data in the survey data is classified as of a second class, the classification being based on importance of data in the survey data; and generating a graphical display of survey data in which data classified as of a first class is displayed graphically as a point outside the control line and a solid vector from that point and data classified as of a second class is displayed graphically as a point outside the control line and a stub vector from that point, the length of each said stub vector is shorter than the length of each said solid vector as not to obscure other vectors and the control line, whereby said survey data is obtained from survey selected from a group comprising a global positioning system survey and an optical instrument survey.

16. The computer readable medium of claim 15, wherein the first class comprises data classified as 'important' and the second class comprises data classified as 'less important'.

17. The computer readable medium as set forth in claim 15, wherein the length of each stub vector is selected such that each stub vector is of sufficient length to provide a visual appreciation of the vector direction but sufficiently short that a majority of the stub vectors in the graphical display do not obscure each other or the rest of the display.

18. The computer readable medium as set forth in claim 15, further comprising instructions, which when executed, perform a step for classifying the survey data.

* * * * *